US012578606B2

(12) United States Patent

Kawai

(10) Patent No.: US 12,578,606 B2

(45) Date of Patent: *Mar. 17, 2026

(54) DISPLAY DEVICE

(71) Applicant: Japan Display Inc., Tokyo (JP)

(72) Inventor: Kentaro Kawai, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/823,715

(22) Filed: Sep. 4, 2024

(65) Prior Publication Data

US 2024/0427204 A1 Dec. 26, 2024

Related U.S. Application Data

(63) Continuation of application No. 18/460,686, filed on Sep. 5, 2023, now Pat. No. 12,111,551.

(30) Foreign Application Priority Data

Sep. 6, 2022 (JP) ................................. 2022-141358

(51) Int. Cl.
*G02F 1/1362* (2006.01)
*G02F 1/1345* (2006.01)

(52) U.S. Cl.
CPC .... *G02F 1/13629* (2021.01); *G02F 1/136209* (2013.01); *G02F 1/1345* (2013.01); *G02F 1/13454* (2013.01); *G02F 1/13456* (2021.01)

(58) Field of Classification Search
CPC ............. G02F 1/133512; G02F 1/1345; G02F 1/13452; G02F 1/13454; G02F 1/13456
See application file for complete search history.

(56) References Cited

U.S. PATENT DOCUMENTS

| | | | | |
|---|---|---|---|---|
| 12,111,551 | B2 * | 10/2024 | Kawai ................. | G02F 1/13629 |
| 2006/0139505 | A1 | 6/2006 | Yoshinaga | |
| 2014/0049453 | A1 * | 2/2014 | Lee ................... | G02F 1/133512 |
| | | | | 345/55 |
| 2014/0132873 | A1 * | 5/2014 | Ogasawara ........... | G02F 1/1309 |
| | | | | 349/43 |

(Continued)

FOREIGN PATENT DOCUMENTS

| | | |
|---|---|---|
| CN | 109613743 A | 4/2019 |
| JP | 2021-092702 A | 6/2021 |

(Continued)

*Primary Examiner* — Alexander P Gross
(74) *Attorney, Agent, or Firm* — XSENSUS LLP

(57) ABSTRACT

A display device includes an array substrate including a display region arranged with pixels and a peripheral region outside the display region, a counter substrate facing the array substrate, and a liquid crystal layer between the array substrate and the counter substrate. The display region includes a plurality of scanning signal lines extending in a first direction and arranged in a second direction intersecting the first direction, and a plurality of data signal lines extending in the second direction and arranged in the first direction. The peripheral region includes a first wiring pattern arranged with a plurality of first wirings connecting a scanning signal line driver circuit and the plurality of scanning signal lines, and a second wiring pattern arranged with a plurality of second wirings being supplied with a certain electric potential.

16 Claims, 10 Drawing Sheets

(56)         References Cited

U.S. PATENT DOCUMENTS

2020/0365623 A1* 11/2020 Chien ................. G02F 1/13452
2022/0283462 A1   9/2022 Ohue
2022/0299807 A1   9/2022 Ohue

FOREIGN PATENT DOCUMENTS

JP       2021-092748 A   6/2021
WO    2020116533 A1   6/2020

* cited by examiner

DISPLAY DEVICE

CROSS-REFERENCE TO RELATED APPLICATIONS

This application is continuation of U.S. application Ser. No. 18/460,686, filed on Sep. 5, 2023, which claims the benefit of priority to Japanese Patent Application No. 2022-141358, filed on Sep. 6, 2022, the entire contents of each are incorporated herein by reference.

FIELD

An embodiment of the present invention relates to a wiring structure for a display device.

BACKGROUND

As liquid crystal displays, there are known transmission-type displays that display images by transmitting light from a backlight arranged behind a liquid crystal panel, reflection-type displays that display images by reflecting outside light through pixel electrodes, and semi-transmissive displays that combine the features of both transmission and reflection types. These liquid crystal displays are used as displays in personal computers, smartphones, and other electronic devices, and have a configuration where the background cannot be seen through the screen.

In contrast, a display device that allows the back to be visible while displaying an image has been developed. For example, there is a display device in which the display region is configured by a polymer-dispersed liquid crystal arranged between a pair of translucent substrates, and the back can be seen through the screen.

A display device in which the back is visible can enhance its design by making not only the display region but also the peripheral region outside the display region (also called frame region) transparent. However, there can be a difference in transparency between the display region where pixels are arranged and the peripheral region where wiring is arranged.

SUMMARY

A display device in an embodiment according to the present invention includes an array substrate including a display region arranged with pixels and a peripheral region outside the display region, a counter substrate facing the array substrate, and a liquid crystal layer between the array substrate and the counter substrate. The display region includes a plurality of scanning signal lines extending in a first direction and arranged in a second direction intersecting the first direction, and a plurality of data signal lines extending in the second direction and arranged in the first direction. The peripheral region includes a first wiring pattern arranged with a plurality of first wirings connecting a scanning signal line driver circuit and the plurality of scanning signal lines, and a second wiring pattern arranged with a plurality of second wirings being supplied with a certain electric potential. The first wiring pattern extends in a diagonal direction intersecting the plurality of first wirings in the first direction and the second direction. The second wiring pattern is arranged with the plurality of second wirings parallel to the plurality of first wirings.

BRIEF DESCRIPTION OF DRAWINGS

FIG. 2 is a cross-sectional schematic diagram showing the structure corresponding to the space between V1-V2 of the display device shown in FIG. 1.

FIG. 4 is a plan view of a configuration of a light shielding layer in a display device according to an embodiment of the present invention.

DESCRIPTION OF EMBODIMENTS

Hereinafter, embodiments of the present invention are described with reference to the drawings. However, the present invention can be implemented in many different aspects, and should not be construed as being limited to the description of the following embodiments. For the sake of clarifying the explanation, the drawings may be expressed schematically with respect to the width, thickness, shape, and the like of each part compared to the actual aspect, but this is only an example and does not limit the interpretation of the present invention. For this specification and each drawing, elements similar to those described previously with respect to previous drawings may be given the same reference sign (or a number followed by A, B, a, b, etc.) and a detailed description may be omitted as appropriate. The terms "first" and "second" appended to each element are a convenience sign used to distinguish them and have no further meaning except as otherwise explained.

As used herein, where a member or region is "on" (or "below") another member or region, this includes cases where it is not only directly on (or just under) the other member or region but also above (or below) the other member or region, unless otherwise specified. That is, it includes the case where another component is included in between above (or below) other members or regions.

First Embodiment

A display device 100 according to the first embodiment of the present invention will be described with reference to the drawings.

1-1. Outline of Display Device

Figure 1:
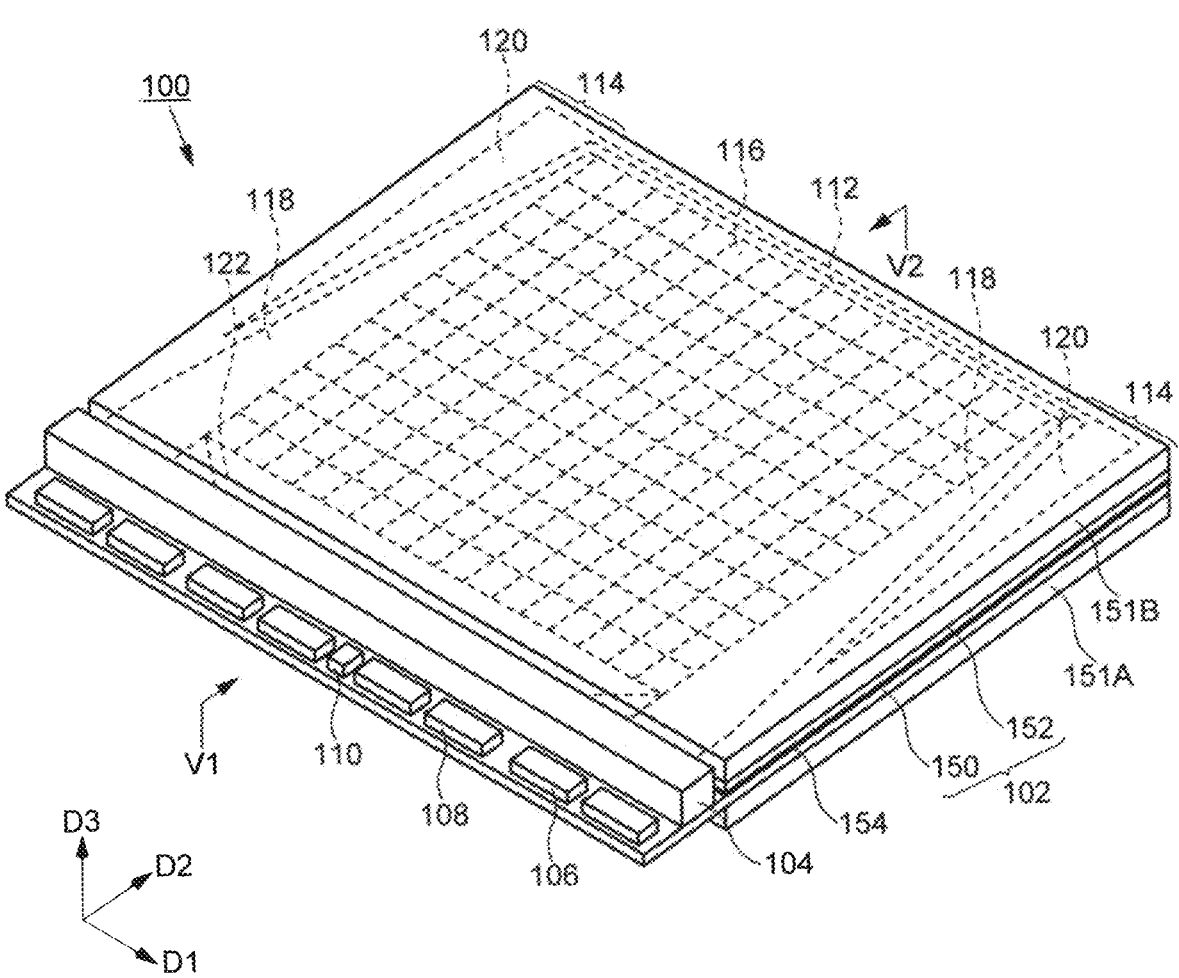
FIG. 1 is a diagram showing a configuration of a display device according to an embodiment of the present invention.

FIG. 1 shows a diagram of the display device 100 according to an embodiment of the present invention. The display device 100 includes a display panel 102, a light source 104, a first transparent substrate 151A and a second transparent substrate 151B that sandwich the display panel 102. The display panel 102 includes an array substrate 150, a counter substrate 152, and a liquid crystal layer (not shown) between the array substrate 150 and the counter substrate 152. The display panel 102 has a display region 112 and a peripheral region 114, a plurality of pixels 116 are arranged in the display region 112, and a driver circuit such as a scanning signal line driver circuit 106 and a data signal line driver circuit 108, a first wiring pattern 118, a second wiring pattern 120, and the like are arranged in the peripheral region 114.

In the following description, one direction when the display panel 102 is viewed in a plan view is defined as direction D1, the direction orthogonal to the direction D1 is defined as direction D2, and the direction orthogonal to the plane D1-D2 is defined as direction D3.

The array substrate 150 and the counter substrate 152 have translucency. The array substrate 150 and the counter substrate 152 are preferably transparent to visible light. The counter substrate 152 is arranged in the direction D3 opposite the array substrate 150. The array substrate 150 and the counter substrate 152 are arranged opposite each other with a gap between them and are fixed by the sealant 154. The array substrate 150 and the counter substrate 152 have a gap, and a liquid crystal layer, not shown, is arranged in the gap.

The display region 112 has a plurality of pixels 116 arranged in the direction D1 (row direction) and in the direction D2 (column direction). For example, m pixels are arranged along the direction D1, and n pixels are arranged along the direction D2 in the display region 112. The number of the plurality of pixels 116 (the numbers of m and n) are set appropriately according to the vertical and horizontal display resolutions. The display region 112 has scanning signal lines extending in the direction D1 and data signal lines extending in the direction D2 along the direction D1.

The scanning signal line driver circuit 106 and the data signal line driver circuit 108 are arranged in the peripheral region 114 of the array substrate 150. FIG. 1 shows an aspect in which the scanning signal line driver circuit 106 and the data signal line driver circuit 108 are arranged in an integrated circuit (IC) and are mounted on the array substrate 150 in a COG (Chip on Glass) method. The scanning signal line driver circuit 106 and data signal line driver circuit 108 may be implemented in a COF (Chip on Film) method or formed by thin-film transistors (TFTs) on the array substrate 150, without being limited to the aspect shown in the figure.

The peripheral region 114 includes a first wiring pattern 118, a second wiring pattern 120, and a third wiring pattern 122. The first wiring pattern 118 is formed by first wirings that connect the scanning signal line driver circuit 106 and scanning signal lines 107 (refer to FIG. 3) that are arranged in the display region 112. The second wiring pattern 120 is formed by second wirings that surround the outside of the display region 112. The second wirings can be called the common wirings since a constant voltage (common voltage) is applied to them. The second wirings are also used as wiring to apply a common voltage to the counter electrode 162 (refer to FIG. 5) arranged on the counter substrate 152. The third wiring pattern 122 is formed by third wirings that connects the data signal line driver circuit 108 and the data signal lines 109 (refer to FIG. 3), which is arranged in the display region 112.

The light source 104 has a structure along the direction D1. The light source 104 is configured, for example, with light emitting diodes (LED: Light Emitting Diode) arrayed along the direction D1. The detailed structure of the light source 104 is not limited and may include optical components such as reflectors, diffusers, and lenses in addition to the light emitting diodes arrayed in the direction of D1. The light source 104 and a light emission control circuit 110 that controls the light source 104 may be arranged as a separate component independent of the display panel 102. The light source 104 may have its light emission timing controlled by the light emission control circuit 110 that is synchronized with the scanning signal line driver circuit 106 and the data signal line driver circuit 108. The light emission control circuit 110 that controls the light source 104 may be installed as a separate component from the display panel 102, just like the light source 104, may be mounted on the array substrate 150 as a separate component, or may be installed in the scanning signal line driver circuit 106 or the data signal line driver circuit 108. The light source 104 arranged along the direction of D1 has light incident from the side of the second transparent substrate 151B (or the first transparent substrate 151A) and propagates the light toward the direction D2.

The first transparent substrate 151A and the second transparent substrate 151B are arranged between the display region 112 and the peripheral region 114. The first transparent substrate 151A and the second transparent substrate 151B have a function as protective members for the display panel 102. As will be explained with reference to FIG. 2, the first transparent substrate 151A and the second transparent substrate 151B have a function as light guide plates that guide light emitted from the light source 104 into the display panel 102.

Figure 2:
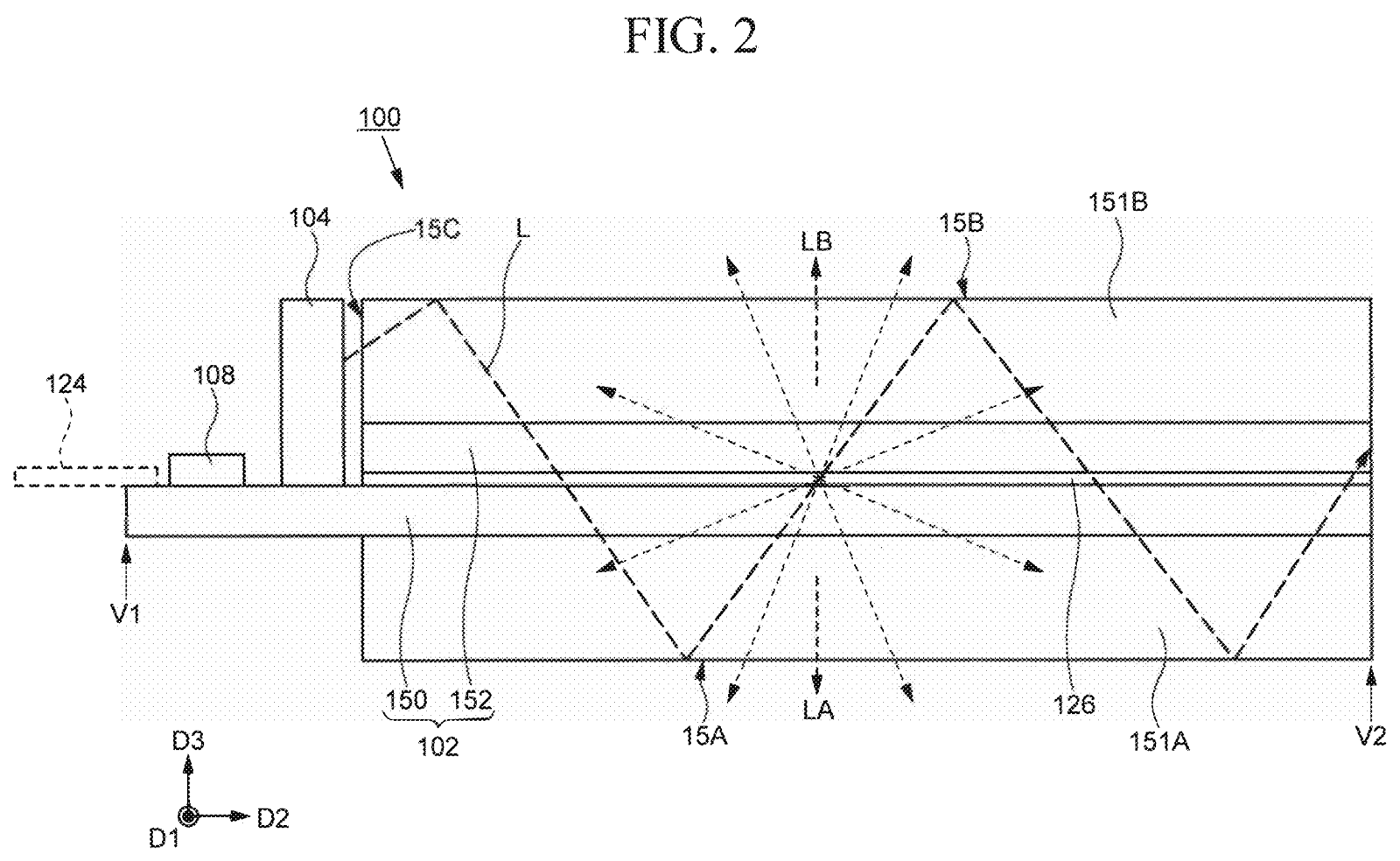

FIG. 2 shows a cross-sectional structure of the display device 100 corresponding to the section between V1-V2 shown in FIG. 1. As shown in FIG. 2, the first transparent substrate 151A and the second transparent substrate 151B are arranged to sandwich the display panel 102. The first transparent substrate 151A is arranged on the array substrate 150 side and the second transparent substrate 151B is arranged on the counter substrate 152 side. A glass substrate or a plastic substrate is used as the first transparent substrate 151A and the second transparent substrate 151B. The first transparent substrate 151A and the second transparent substrate 151B have transparency and it is preferred that they have a refractive index equivalent to that of the array substrate 150 and the counter substrate 152. The array substrate 150 and the first transparent substrate 151A, and the counter substrate 152 and the second transparent substrate 151B are bonded by a transparent adhesive which is not shown.

The array substrate 150 is larger than the counter substrate 152 in a plan view, and a portion of the peripheral region 114 is exposed from the counter substrate 152. The driver circuits are arranged in this exposed region. FIG. 2 shows a configuration in which a data signal line driver circuit 108 is arranged as one of the driver circuits. Terminals which are not shown are arranged in the peripheral region 114, and a flexible wiring substrate 124 is attached to the peripheral region 114.

The light source 104 is arranged adjacent to one side of the first transparent substrate 151A or the second transparent substrate 151B. FIG. 2 shows a configuration in which the light source 104 is arranged adjacent to a first side 15C of the second transparent substrate 151B. The light source 104 is sometimes referred to as a side light source because it emits light L toward the first side 15C. FIG. 2 shows a configuration in which the light source 104 is mounted on the array substrate 150, but there is no limitation on the configuration in which the light source 104 is arranged, and there is no limitation on the mounting structure as long as the mounting position can be fixed. The light source 104 may be supported, for example, by an enclosure surrounding the display panel 102.

As shown in FIG. 2, light emitted from the light source 104 enters the second transparent substrate 151B from the first side 15C. The first side 15C of the second transparent substrate 151B, which is counter substrate to the light source 104, is the light-entering surface.

As shown schematically in FIG. 2, light L incident from the first side 15C of the second transparent substrate 151B enters the display panel 102 and further propagates in a direction away from the first side 15C (direction D2) while being reflected by a first plane 15A of the first transparent substrate 151A and a second plane 15B of the second transparent substrate 151B. When light L travels outward from the first plane 15A of the first transparent substrate 151A and the second plane 15B of the second transparent substrate 151B, it will travel from a medium with a large refractive index to a medium with a small refractive index. When the angle of incidence of light L incident on the first plane 15A and the second plane 15B is larger than the critical angle, the light will be totally reflected and will be guided in the direction D2 while being reflected by the first plane 15A and the second plane 15B.

The liquid crystal layer 126 is formed of polymer-dispersed liquid crystal. The liquid crystal layer 126, which is formed of polymer-dispersive liquid crystal, is controlled to be in a scattering state and a non-scattering state for each pixel 116 (refer to FIG. 1). As shown in FIG. 2, light L propagating while being reflected in the first plane 15A and the second plane 15B is scattered at least partially when there is a pixel where the liquid crystal layer 126 is in a scattering state, when the incident angle of the scattered light becomes smaller than the critical angle, the scattered light LA and LB are emitted outward from the first plane 15A and the second plane 15B, respectively, and the emitted scattered light LA and LB are observed by an observer. Other than the regions where scattered light LA and LB are emitted, the array substrate 150 and counter substrate 152, as well as the first transparent substrate 151A and second transparent substrate 151B are translucent (transparent to visible light), and the liquid crystal layer 126 is in the non-scattering state, so it is substantially transparent, and the observer can see through the display panel 102 to the back side of the panel.

1-2. Configuration of Array Substrate

Figure 3:
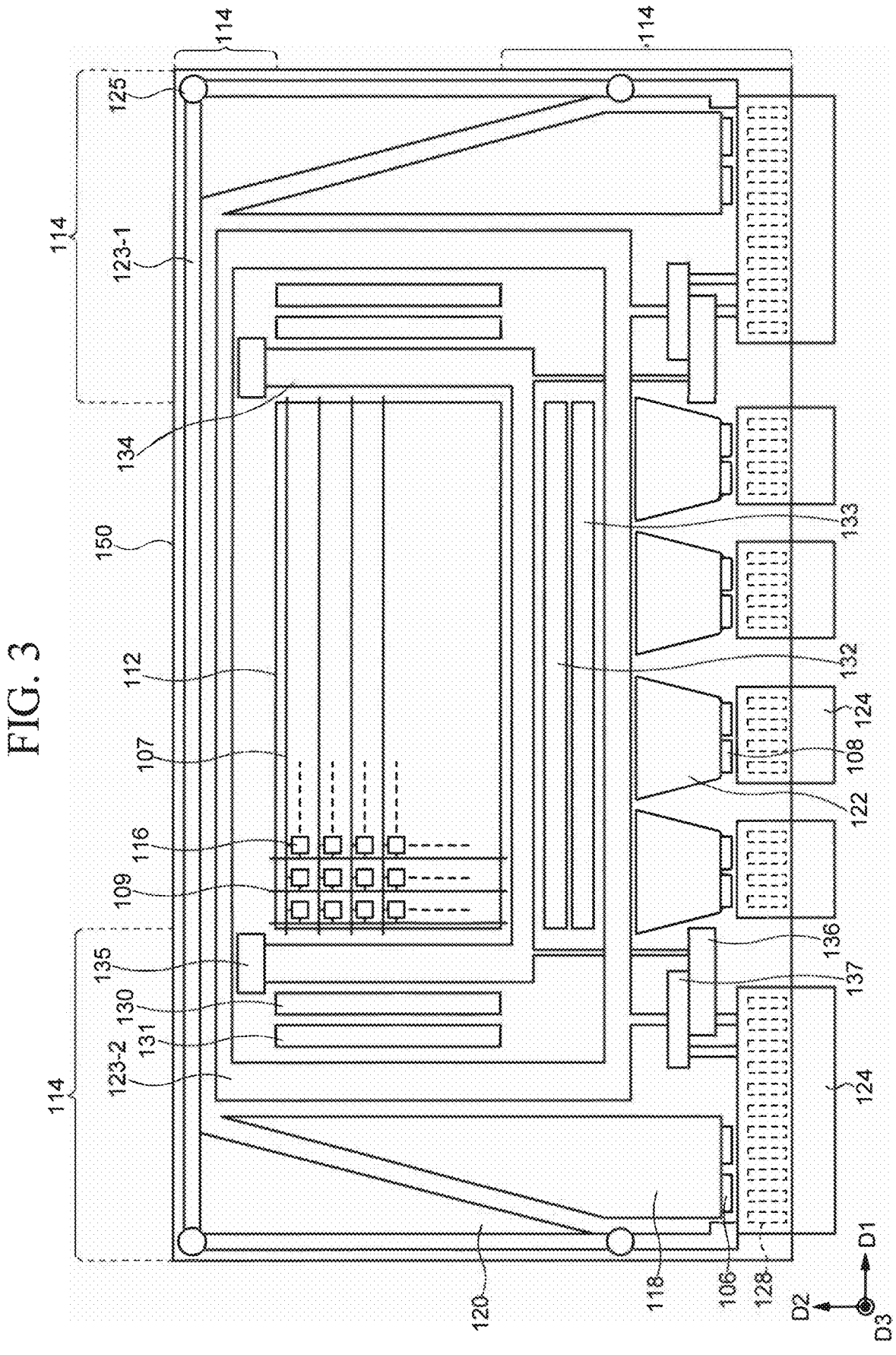
FIG. 3 is a diagram showing a configuration of the array substrate of a display device according to an embodiment of the present invention.

FIG. 3 is a plan view of the array substrate 150 to illustrate its configuration. The array substrate 150 includes a display region 112 and a peripheral region 114. The display region 112 has a plurality of pixels 116 arranged in a matrix. Although not shown, each of the plurality of pixels 116 includes a pixel electrode, a transistor connected to the pixel electrode, a counter electrode, and a liquid crystal layer. The plurality of scanning signal lines 107 extending in the direction D1 are arranged in the display region 112 in the direction D2, and the plurality of data signal lines 109 extending in the direction D1 are arranged in the display region 112 in the direction D2.

The scanning signal line driver circuit 106 and the data signal line driver circuit 108 are arranged in the peripheral region 114. The first wiring pattern 118 formed by the plurality of first wirings extending from the scanning signal line driver circuit 106 to the display region 112, the second wiring pattern 120 formed by second wirings to which a constant voltage (common voltage) is applied, and the third wiring pattern 122 formed by the plurality of third wirings extending from the data signal line driver circuit 108 to the display region 112 are arranged in the peripheral region 114.

Common wirings 123-1, 123-2, common pads 125, and scanning signal line inspection circuits 130, data signal line inspection circuit 132, and terminals 128 for inputting signals from external circuits are arranged in the peripheral region 114. The plurality of terminals 128 are arranged along the direction D1 at the periphery of the array substrate 150. The flexible wiring substrate 124 is attached to the plurality of terminals 128.

The scanning signal line driver circuit 106 is connected to the plurality of scanning signal lines 107 via the plurality of first wirings forming the first wiring pattern 118. Each of the plurality of scanning signal lines 107 is electrically connected to each of the plurality of pixels 116 in the display region 112. The number of the plurality of first wirings forming the first wiring pattern 118 corresponds to the number of scanning signal lines 107 connected to the scanning signal line driver circuit 106. In FIG. 3, the first wiring pattern 118 is shown as being separated from the display region 112, but is actually continuous so as to be connected to the scanning signal lines 107.

The data signal line driver circuit 108 is connected to the plurality of data signal lines 109. Each of the plurality of data signal lines 109 is electrically connected to each of the plurality of pixels 116 in the display region 112. In FIG. 3, the third wiring pattern 122 is shown as being separated from the display region 112 to connect the data signal line driver circuit 108 and the plurality of data signal lines 109, but is actually continuous so as to connect to the data signal lines 109.

Although not shown in FIG. 3 in detail, the plurality of first wirings forming the first wiring pattern 118 extend in diagonal directions. In other words, the plurality of first wirings extends in a direction that intersects the direction D1 and the direction D2. Similarly, the plurality of second wirings forming the second wiring pattern 120 extend in a diagonal direction to be parallel to the first wirings.

The common wirings 123, ESD protection circuit 131, the scanning signal line inspection circuit 130, and the inspection lines 134 are arranged between the first wiring pattern 118 and the display region 112. The common wirings 123, ESD protection circuit 133, the data signal line inspection circuit 132, and the inspection lines 134 are arranged between the third wiring pattern 122 and the display region 112. The inspection lines 134 are connected to the ESD protection circuit 135 and the QD pads 136. The common wirings 123 are connected to the ESD protection circuit 137. The common wiring 123-1 is arranged to surround the peripheral region 114 on the array substrate 150, and signals are supplied from the flexible wiring substrate 124. The common wiring 123-1 is connected to the second wirings included in the second wiring pattern 120.

1-3. Configuration of Counter Substrate

Figure 4:
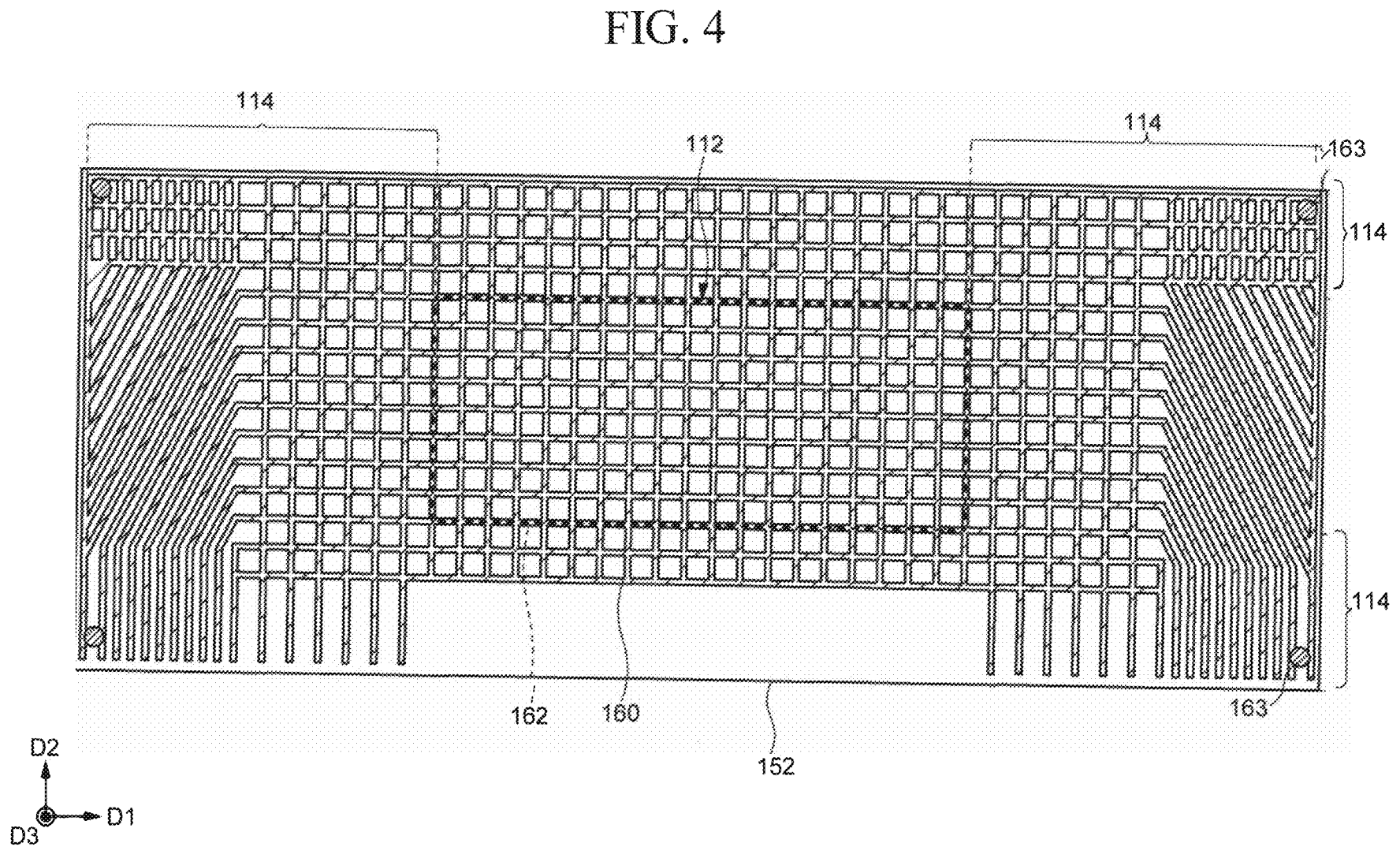

FIG. 4 is a plan view of the configuration of the counter substrate 152. As shown in FIG. 4, a light shielding layer 160 and the counter electrode 162 are arranged on the counter substrate 152. The light shielding layer 160 is arranged in the display region 112 and the peripheral region 114. The counter electrode 162 is arranged in the display region 112. The counter electrode 162 may be arranged to extend not only to the display region 112 but also to the peripheral region 114.

The light shielding layer 160 has a grid pattern overlapping the scanning signal lines 107 and data signal lines 109 in the display region 112. In other words, the light shielding layer 160 has a pattern overlapping the scanning signal lines 107 and the data signal lines 109 which block the transmitted light, and having openings in the transmission region of the pixels 116. Since the pixels 116 are arranged periodically in a matrix in the display region 112, the light shielding layer 160 also has a periodic pattern in the form of a lattice.

The light shielding layer 160 has a diagonally extending stripe pattern in the peripheral region 114. That is, the light shielding layer 160 in the peripheral region 114 has a diagonally extending stripe-shaped pattern that overlaps the first wiring pattern 118 and the second wiring pattern 120 in the overlapping region.

The stripe pattern of the light shielding layer 160 in the peripheral region 114 has a stripe pattern that is inclined in the same direction both in the region overlapping the first wiring pattern 118 and the second wiring pattern 120, thereby allowing the stripe pattern to have continuity. As a result, it is possible to eliminate the distinction between the regions where the first wiring pattern 118 and the second wiring pattern 120 are arranged, so that the appearance is not affected. In other words, even when the display panel 102 is used as a display device that can be seen through to the back (transparent display), the effect of external light reflection can be reduced so as not to cause visual discomfort to the observer.

As described in FIG. 3, the peripheral region 114 is arranged with the scanning signal line inspection circuit 130, the data signal line inspection circuit 132, the ESD protection circuit 133, the inspection lines 134, and the common wirings 123-1, 123-2 to surround the display region 112. The light shielding layer 160 with a lattice pattern is also arranged on the counter substrate 152 in the region overlapping these regions. The lattice pattern in this region has the same or similar pitch as the lattice pattern in the display region 112. It is possible to prevent the boundary between the display region 112 and the peripheral region 114 from being seen by the observer by providing the light shielding layer 160 with such a lattice pattern.

The light shielding layer 160 is formed of a black resin material or metal material. The light shielding layer 160 is formed in contact with the counter electrode 162 (refer to FIG. 5). It is possible to have the light shielding layer 160 function as an auxiliary electrode to reduce resistance loss by forming the light shielding layer 160 with a metallic material in contrast to the counter electrode 162, which is formed with a transparent conductive layer. As a metallic material to form the light shielding layer 160, it is preferable to use chromium, molybdenum, titanium, etc., which have relatively low reflectivity compared to aluminum.

Common pads 163 are arranged on the counter substrate 152. The common pads 163 are formed in the same layer as the light shielding layer 160 and are arranged to conduct with the light shielding layer 160. The common pads 163 are arranged at a position overlapping the common pads 125 of the array substrate 150. The display panel 102 is cell-assembled so that the common pads 125 on the array substrate 150 side and the common pads 163 on the counter substrate 152 side are conductive. As a result, a common voltage is applied from the array substrate 150 to the counter electrode 162. The common pads 125 and the common pads 163 are arranged at the periphery of the panel. The light shielding layer 160 has a function as a wiring connecting the common pads 163 and the counter electrode 162. The light shielding layer 160 has a second grid pattern to reduce the wiring resistance.

1-4. Cross-Sectional Structure of Pixel

Figure 5:
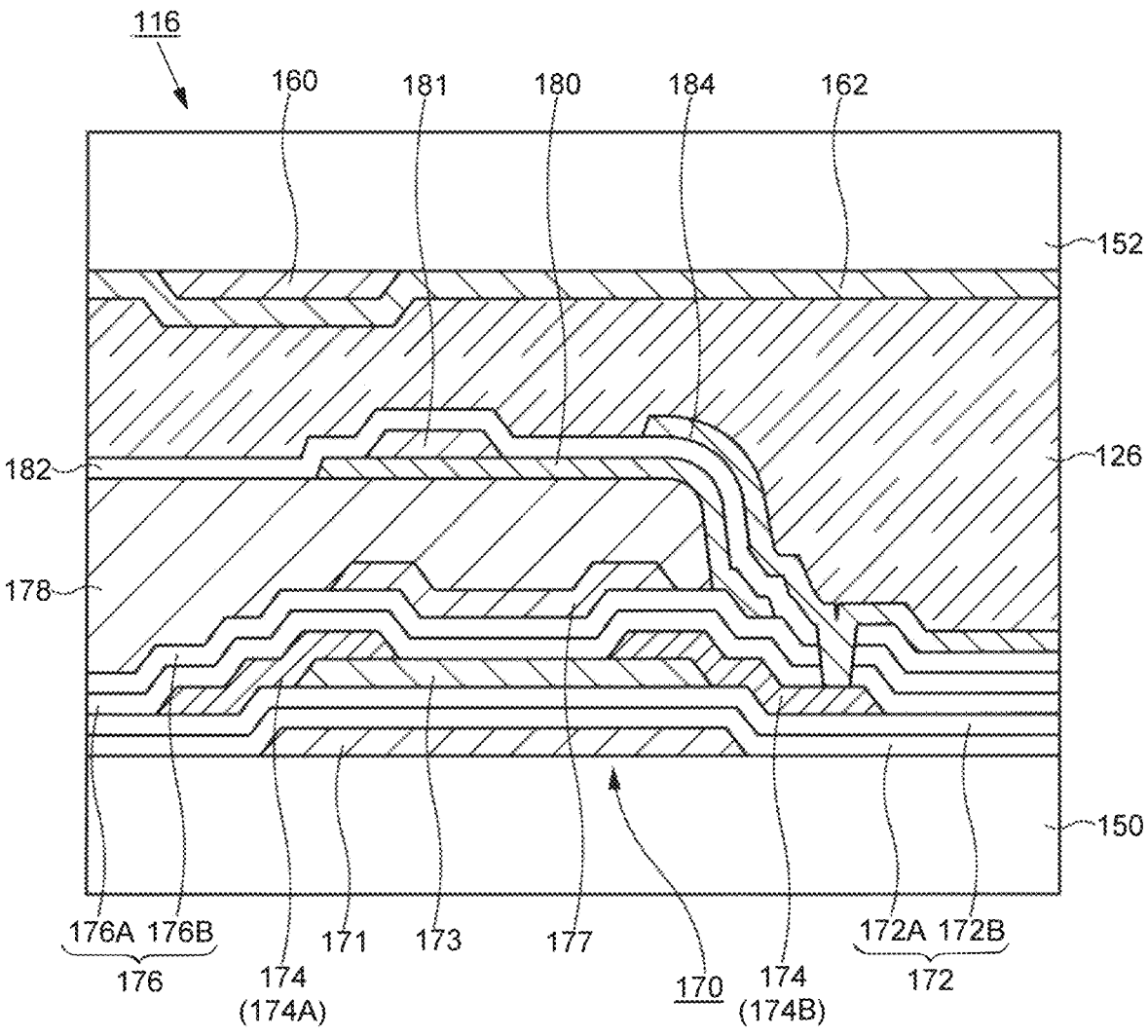
FIG. 5 is a cross-sectional view of a pixel structure in a display device according to an embodiment of the present invention.

FIG. 5 shows the cross-sectional structure of a pixel 116. As shown in FIG. 5, a transistor 170 is arranged on the array substrate 150. The transistor 170 includes a first conductive layer 171 as a gate electrode, a first insulating layer 172, a semiconductor layer 173, and a second conductive layer 174 forming a source electrode 174A and a drain electrode 174B. The first insulating layer 172 is interposed between the first conductive layer 171 and the semiconductor layer 173 and functions as a gate insulating layer. The semiconductor layer 173 is formed of, for example, an oxide semiconductor. The source electrode 174A is connected to the data signal line 109, and the drain electrode 174B is connected to a second transparent conductive layer 184 as the pixel electrode. The first conductive layer 171 is formed of the same layer as the conductive layer forming the scanning signal lines 107, and the source electrode 174A and drain electrode 174B are formed of the conductive layer forming the data signal lines 109. The first insulating layer 172 may have a single-layer structure or may have a structure in which multiple insulating layers are stacked. For example, the first insulating layer 172 may have a structure in which a silicon nitride layer 172A and a silicon oxide layer 172B are stacked.

FIG. 5 shows an example of a bottom-gate type (also called reverse staggered) structure in which the transistor 170 has a first conductive layer 171 as a gate electrode, a first insulating layer 172 as a gate insulating layer, and a semiconductor layer 173 stacked from the side of the array substrate 150, with the source electrode 174A and the drain electrode 174B arranged across the semiconductor layer 173. The transistor 170 that can be used for the pixel 116 is not limited to the structure shown in FIG. 5, and a top-gate type structure can also be applied.

A second insulating layer 176 is arranged over the transistor 170. The second insulating layer 176 is arranged as a passivation layer. The second insulating layer 176 may have a single-layer structure or may have a structure in which multiple insulating layers are stacked. For example, the second insulating layer 176 may have a structure in which a silicon oxide layer 176A and a silicon nitride layer 176B are stacked. A third conductive layer 177 may be arranged on the second insulating layer 176 in a region overlapping the semiconductor layer 173. The third conductive layer 177 is used as a light shielding layer for the semiconductor layer 173 and is used as a back gate electrode when a certain potential is applied.

A planarization layer 178 is arranged on the second insulating layer 176 and the third conductive layer 177. The planarization layer 178 is formed of a transparent organic insulating layer made of an organic material such as acrylic. The planarization layer 178 is arranged to reduce unevenness caused by various components such as the first conductive layer 171, semiconductor layer 173, source electrode 174A, drain electrode 174B, etc., which configure the transistor 170.

As shown in FIG. 5, a first transparent conductive layer 180 is arranged from the top of the planarization layer 178 to the side surface (the stepped portion where the planarization layer 178 has been removed). A fourth conductive layer 181 is arranged in a part of a region above the first transparent conductive layer 180. The first transparent conductive layer 180 is used as a capacitance electrode and the fourth conductive layer 181 is used as capacitance wiring. A third insulating layer 182 is arranged to cover the first transparent conductive layer 180 and the fourth conductive layer 181 and to cover the planarization layer 178 and the second insulating layer 176 exposed from the planarization layer 178. The third insulating layer 182 is formed of an inorganic insulating material such as silicon nitride.

A second transparent conductive layer 184 is arranged over the third insulating layer 182. The second transparent conductive layer 184 is spread over the region where the planarization layer 178 is removed, and some regions overlap the first transparent conductive layer 180 through the third insulating layer 182. The second transparent conductive layer 184 forms a pixel electrode. The second transparent conductive layer 184 as the pixel electrode is connected to the drain electrode 174B through a contact hole formed in the second insulating layer 176. A retention capacitance is formed in the region where the second transparent conductive layer 184 and the first transparent conductive layer 180 overlap through the third insulating layer 182. The array substrate 150 is arranged with a first alignment film (not shown) that is formed to cover the pixel electrode (second transparent conductive layer 184) and the third insulating layer 182.

The planarization layer 178 may be removed in the region where the second transparent conductive layer 184 is arranged in order to increase transparency in the display device 100, through which the back can be seen. This reduces light absorption by the planarization layer 178 and increases transparency. FIG. 5 shows a structure in which the planarization layer 178 is arranged in the region overlapping the transistor 170 and the planarization layer 178 is removed in the region where the second transparent conductive layer forming the pixel electrode is arranged outside the transistor 170. The region outside the transistor 170 has a structure in which the second insulating layer 176 is exposed from the planarization layer 178.

The counter substrate 152 is arranged opposite the array substrate 150. The light shielding layer 160 and the counter electrode 162 are arranged on the counter substrate 152. FIG. 5 shows a structure in which the light shielding layer 160 is arranged, for example, in the region overlapping the source electrode 174A (data signal line 109). The counter electrode 162 has a size that extends over the entire surface of the display region 112. The light shielding layer 160 may be formed of a metal film, as described above, and is arranged in contact with the counter electrode 162, which is formed of a transparent conductive layer, thereby functioning as an auxiliary electrode. The counter substrate 152 is arranged with a second alignment film (not shown) that is formed to cover the counter electrode 162.

The liquid crystal layer 126 is arranged between the array substrate 150 and the counter substrate 152. The liquid crystal layer 126 is formed of the polymer-dispersed liquid crystal. The polymer-dispersed liquid crystal can be used in either normal mode, in which it changes from a scattering state to a non-scattering state (transparent), or reverse mode, in which it changes from a non-scattering state (transparent) to a scattering state, depending on the state in which voltage is applied to the second transparent conductive layer 184 as the pixel electrode. Since the polymer dispersed liquid crystal does not require a polarizing plate, the display panel 102 can be seen through in the non-scattered state (transparent), allowing the back side to be viewed.

1-5. Wiring Patterns

The details of the first wiring pattern 118 and the second wiring pattern 120 are described next with reference to FIG. 6A, FIG. 6B, and FIG. 6C.

Figure 6A:
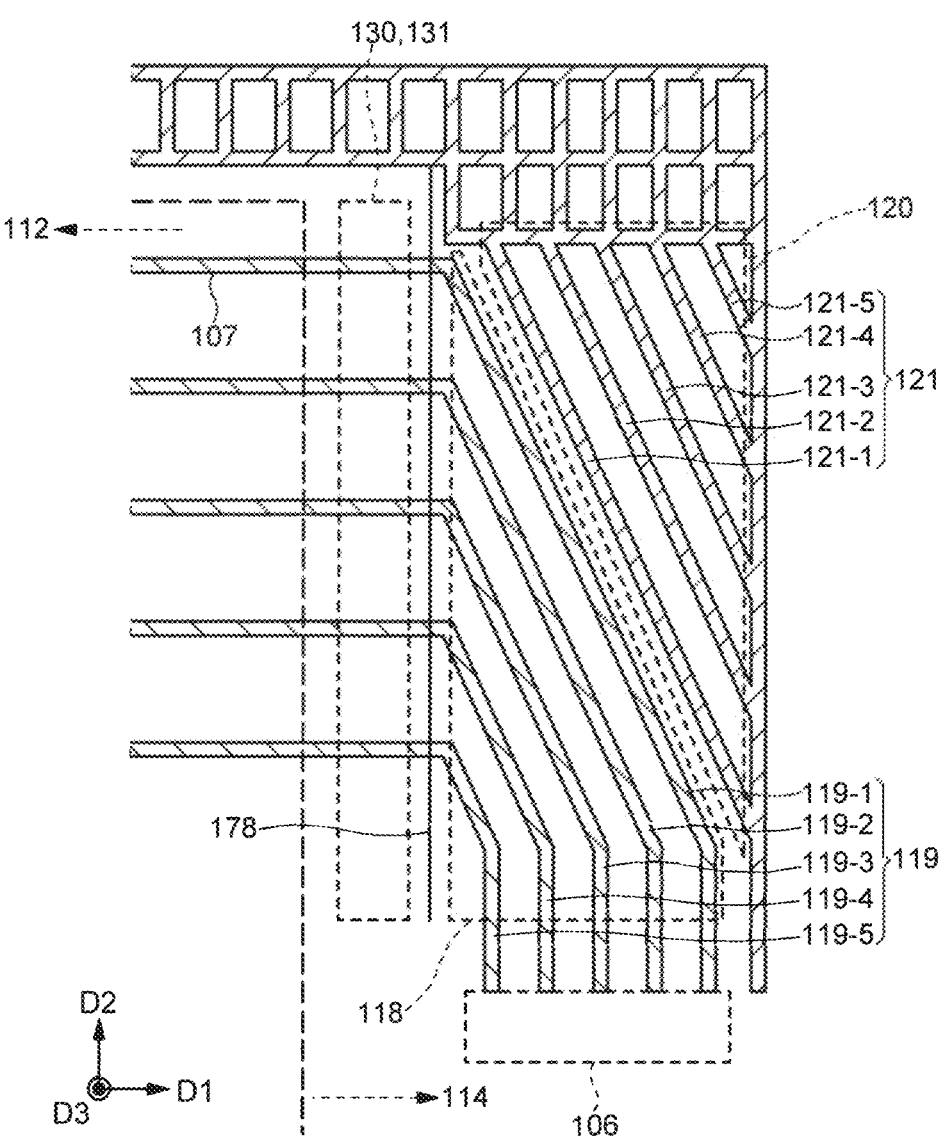
FIG. 6A is a plan view showing a configuration of wirings arranged in a peripheral region of a display device according to an embodiment of the present invention.

FIG. 6A shows the first wiring pattern 118 and the second wiring pattern 120 arranged on the array substrate 150. The first wiring pattern 118 and the second wiring pattern 120 are arranged in the peripheral region 114. The first wiring pattern 118 is formed by the first wirings 119 connecting the scanning signal line driver circuit 106 and the scanning signal lines 107. The second wiring pattern 120 is formed by the second wirings 121 having a common potential.

The first wirings 119 are arranged appropriately according to the number of scanning signal lines 107. FIG. 6A shows, as an example, a plurality of first wirings 119-1, 119-2, 119-3, 119-4, 119-5. Focusing on the first wiring 119-1, the first wiring 119-1 includes a first linear portion extending from the scanning signal line driver circuit 106 in the direction D2 and a second linear portion extending from this linear portion in a diagonal direction toward the scanning signal lines 107. The other first wirings 119-2, 119-3, 119-4, 119-5 are similar, and are arranged so that the second linear portions intersecting the direction D1 and direction D2 are parallel.

The second wiring pattern 120 is arranged adjacent to the first wiring pattern 118. The second wiring pattern 120 has a linear pattern that extends in a diagonal direction to intersect the direction D1 and direction D2 from a grid pattern arranged in the peripheral region of the display region 112. FIG. 6A shows the second wirings 121-1, 121-2, 121-3, 121-4, 121-5 as an example. As shown in FIG. 6A, the second wirings 121-1, 121-2, 121-3, 121-4, 121-5 are interconnected and have a grid-like pattern.

The plurality of first wirings 119-1, 119-2, 119-3, 119-4, 119-5 have a straight wiring portion extending in a diagonal direction to intersect the direction D1 and direction D2 and a plurality of second wirings 121-1, 121-2, 121-3, 121-4, 121-5 are arranged parallel thereto. The first wiring pattern 118 formed by the plurality of first wirings 119-1, 119-2, 119-3, 119-4, 119-5 cannot fill the peripheral region 114 adjacent to the display region 112. However, it is possible to fill the region that cannot be filled by the first wiring pattern 118 by providing the second wiring pattern 120 formed by the plurality of second wirings 120-1, 121-2, 121-3, 121-4, 121-5. The first wiring pattern 118 and the second wiring pattern 120 are formed by stripes of wiring that are inclined at the same angle and arranged at the same interval to provide continuity of the patterns.

Figure 6B:
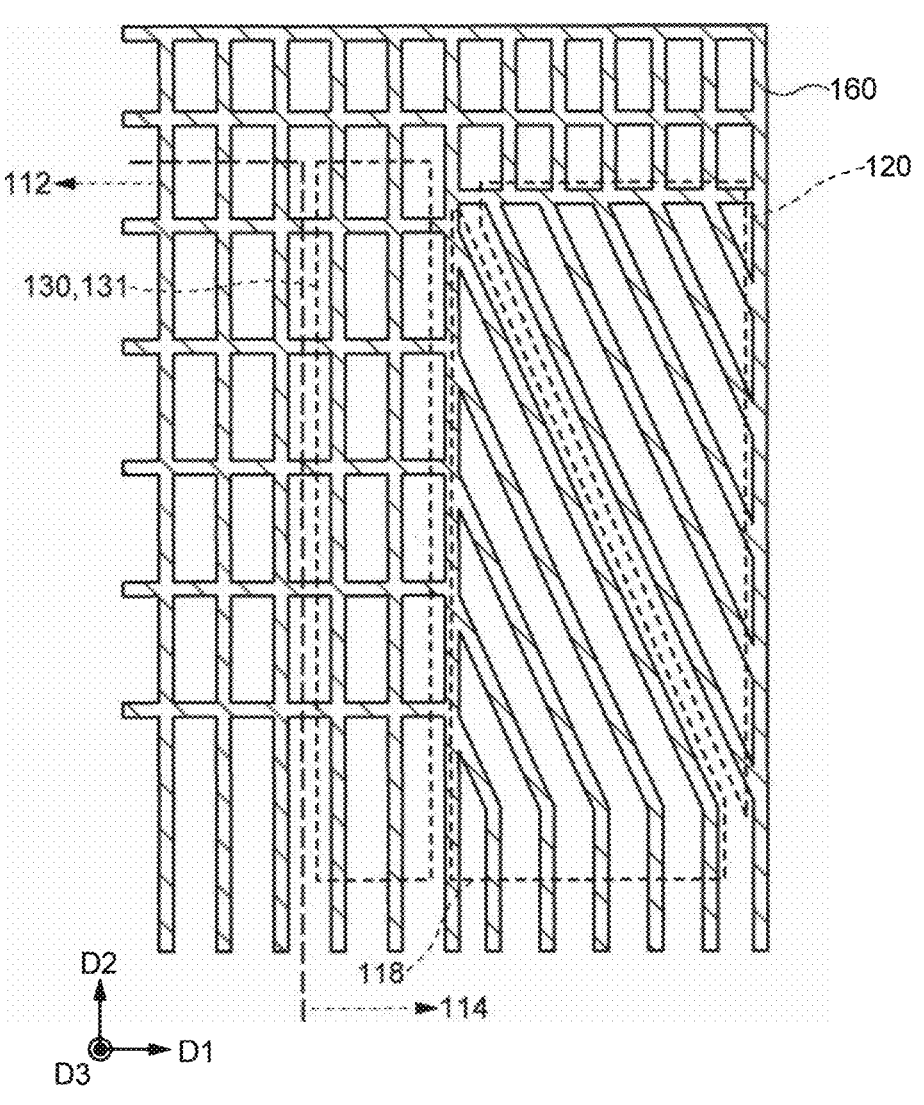
FIG. 6B is a plan view showing a configuration of a light shielding layer arranged in a peripheral region of a display device according to an embodiment of the present invention.

FIG. 6B shows the pattern of the light shielding layer 160 arranged on the counter substrate 152. As described with reference to FIG. 4, the light shielding layer 160 has a grid-like pattern in the display region 112 and the peripheral region 114 adjacent to the display region 112 (where the scanning signal line inspection circuit 130, the ESD protection circuit 131 are arranged), and has a stripe pattern that extends in a diagonal direction in the region overlapping the first wiring pattern 118 and the second wiring pattern 120. The diagonally extending stripe-shaped pattern of the light shielding layer 160 is arranged so that it overlaps the first wirings 119 forming the first wiring pattern 118 and the second wirings 121 forming the second wiring pattern 120. The stripe-shaped pattern extending in the diagonal direction arranged in the region where the light shielding layer 160 overlaps the first wiring pattern 118 is connected to the lattice-shaped pattern arranged in the region where the light shielding layer 160 overlaps the display region 112. The diagonally extending stripe pattern arranged in the region where the light shielding layer 160 overlaps the second wiring pattern 120 is connected to the lattice pattern.

The first wiring pattern 118 and the second wiring pattern 120, which are formed by metal films, can be light shielding in the peripheral region 114, by providing a light shielding layer 160 with such a pattern. The light shielding layer 160 has the second grid pattern, which allows the aperture ratio (ratio of light-transmitting regions in the display region and peripheral regions) of the light shielding layer 160 to be the same or close to the same value in the display region 112 and the peripheral region 114 (region where scanning signal line inspection circuit 130, ESD protection circuit 131, etc. are arranged) adjacent to the display region 112. Thereby, there can be no difference in transparency from the display region 112 to the peripheral region 114, and these two boundary regions can be made inconspicuous.

Figure 6C:
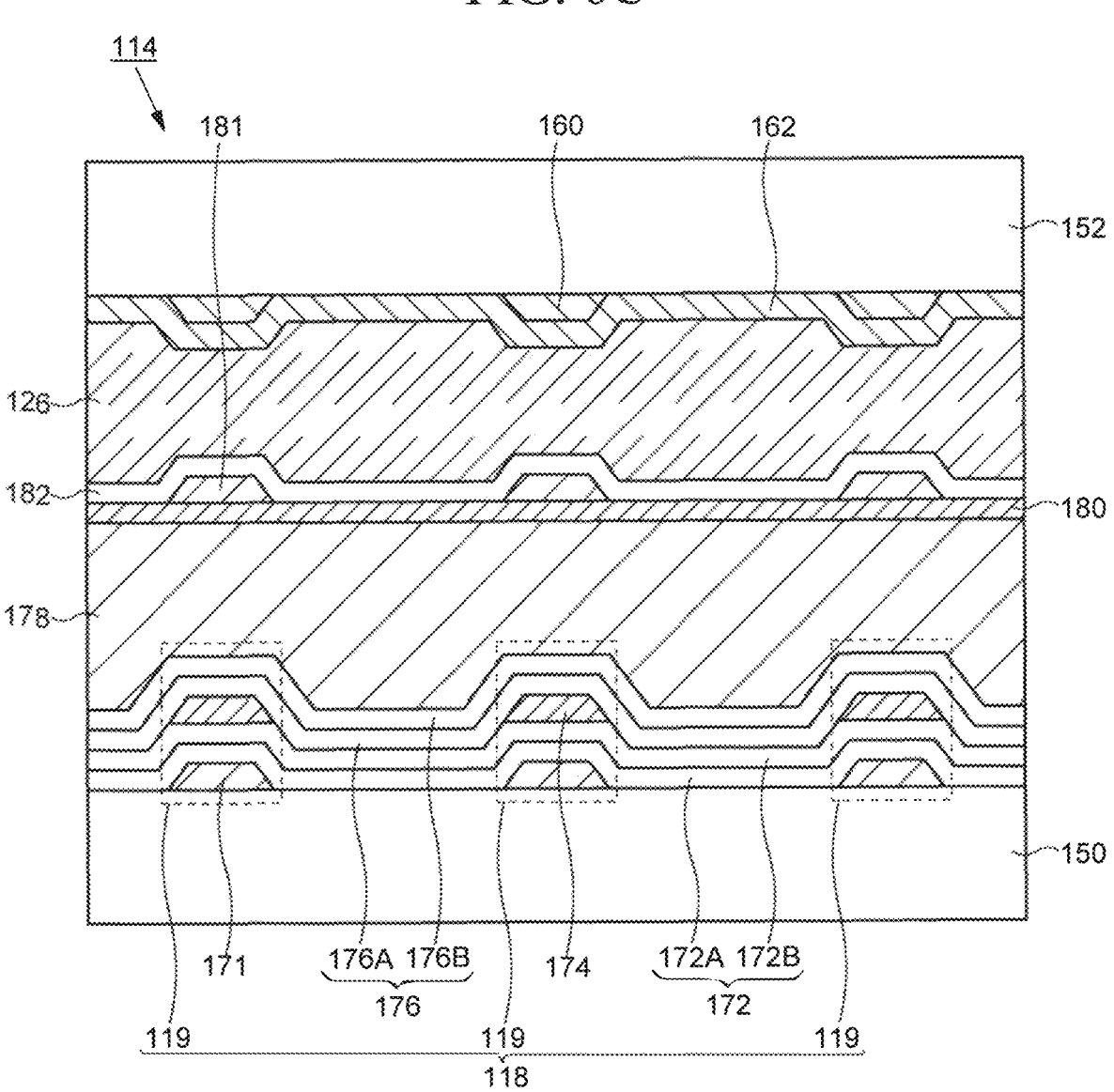
FIG. 6C is a cross-sectional view showing a configuration of wirings and a light shielding layer arranged in a peripheral region of a display device according to an embodiment of the present invention.

FIG. 6C is a cross-sectional view of the peripheral region 114 and shows the cross-sectional structure of the first wiring pattern 118. As shown in FIG. 6C, the first wirings 119 on the array substrate 150 side are formed by the first conductive layer 171 and the second conductive layer 174. The first conductive layer 171 and the second conductive layer 174 overlap across the first insulating layer 172. The first conductive layer 171 and the second conductive layer 174 may be connected to each other through contact holes (not shown) formed in the first insulating layer 172.

The first conductive layer 171 and the second conductive layer 174 are formed of metallic films. The metallic films are preferably formed of metallic materials such as aluminum, titanium, molybdenum, or other conductive metallic compounds such as titanium nitride. The first conductive layer 171 and the second conductive layer 174 may have a plurality of metal films stacked on top of each other. For example, the first conductive layer 171 may have an aluminum layer and a titanium layer stacked on top of each other. The second conductive layer 174 may have a structure in which a titanium layer is sandwiched between the top and bottom of the aluminum layer, and a titanium nitride layer may be arranged on the outside of the aluminum layer.

The first wirings 119 are embedded by the planarization layer 178. The planarization layer 178 is formed of an organic material such as acrylic, as described above. The first transparent conductive layer 180 is arranged as a shield layer on top of the planarization layer 178. The first transparent conductive layer 180 is arranged to spread over the entire region where the first wiring pattern 118 is arranged. The first transparent conductive layer 180 is formed of a transparent conductive film such as indium tin oxide. The fourth conductive layer 181 is arranged in contact with the first transparent conductive layer 180. The fourth conductive layer 181 is formed of the same metallic material as the first conductive layer 171 and the second conductive layer 174.

The fourth conductive layer 181 has a pattern that overlaps the first wirings 119 and the second wirings 121. The fourth conductive layer 181 is arranged in contact with the first transparent conductive layer 180, which is arranged as a shield layer, and functions as auxiliary wiring to reduce the resistance loss of the shield layer.

The light shielding layer 160 on the counter substrate 152 side is arranged so that it overlaps the first wirings 119 and the second wirings 121. The counter electrode 162 is arranged to cover the light shielding layer 160. Since the peripheral region 114 is not a region for displaying images, the counter electrode 162 is not essential, however, it can be ensured that there is no difference in the transparency (or transmittance) between the display region 112 and the peripheral region 114, by providing it in the same manner as the display region 112. The liquid crystal layer 126 in the peripheral region 114 is sandwiched between the first transparent conductive layer 180 as a shield layer and the counter electrode 162, and since both are fixed at a constant potential, the alignment state of the liquid crystal layer 126 is not affected and the non-scattering state (transparent) can be maintained.

As shown in this embodiment, it is possible to have continuity in the pattern without affecting the appearance, by forming the first wiring pattern 118 and the second wiring pattern 120 in a stripe pattern extending in the same diagonal direction, and then overlaying the pattern of the light shielding layer 160 on the first wiring pattern 118 and the second wiring pattern 120. It is possible to prevent the boundary between the two regions from being seen by spreading the grid pattern of the light shielding layer 160, which overlaps on the display region 112, to the peripheral region 114, so that the observer does not feel uncomfortable.

It is possible to make the pattern have continuity and not affect the appearance, by having the stripe pattern of the light shielding layer 160 in the peripheral region 114 have a stripe pattern that is inclined in the same direction in the region overlapping the first wiring pattern 118 and the second wiring pattern 120. In other words, even when the display panel 102 is used as a transparent display, the effect of external light reflection can be reduced so as not to cause visual discomfort to the observer.

Second Embodiment

This embodiment shows a different structure of the peripheral region 114 in the display device 100 shown in the first embodiment.

Figure 7A:
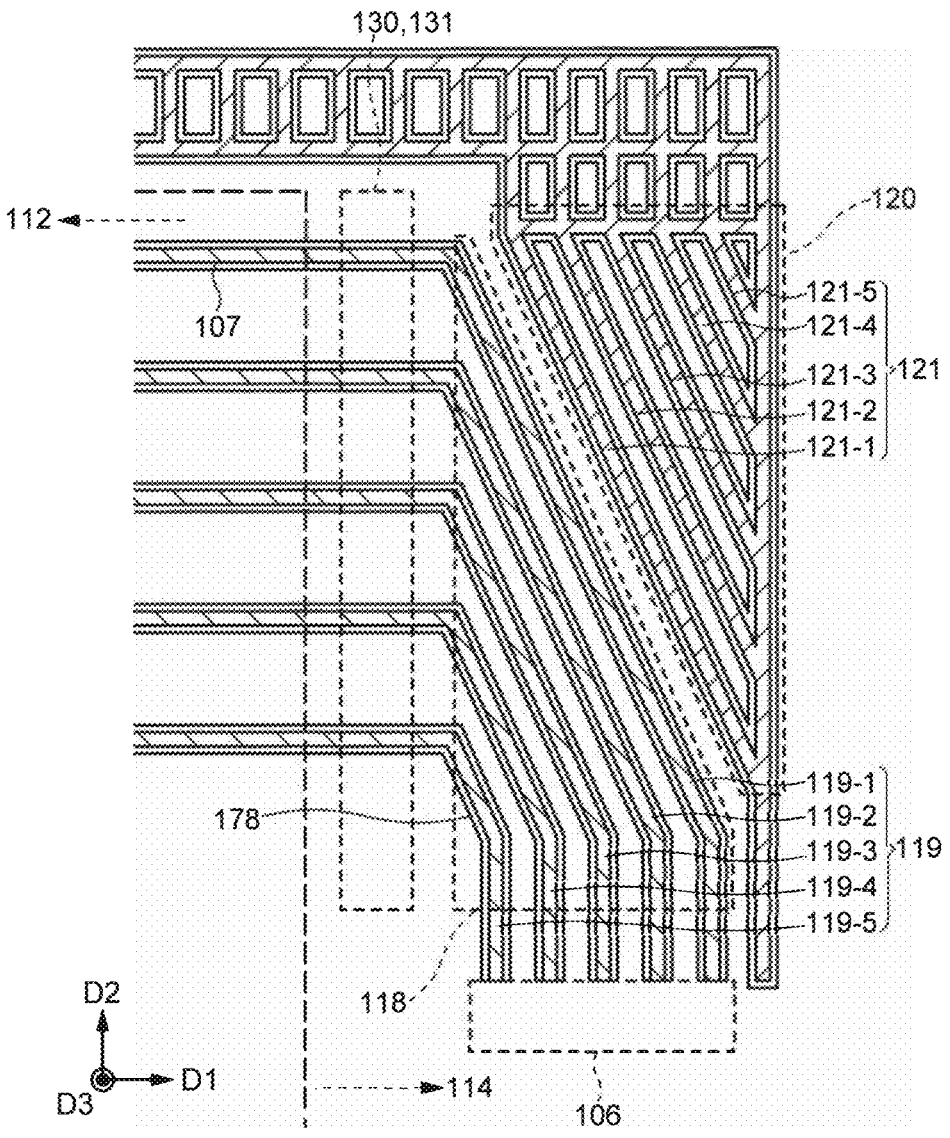
FIG. 7A is a plan view showing a configuration of wirings and a planarization layer arranged in the peripheral region of a display device according to an embodiment of the present invention.
Figure 7B:
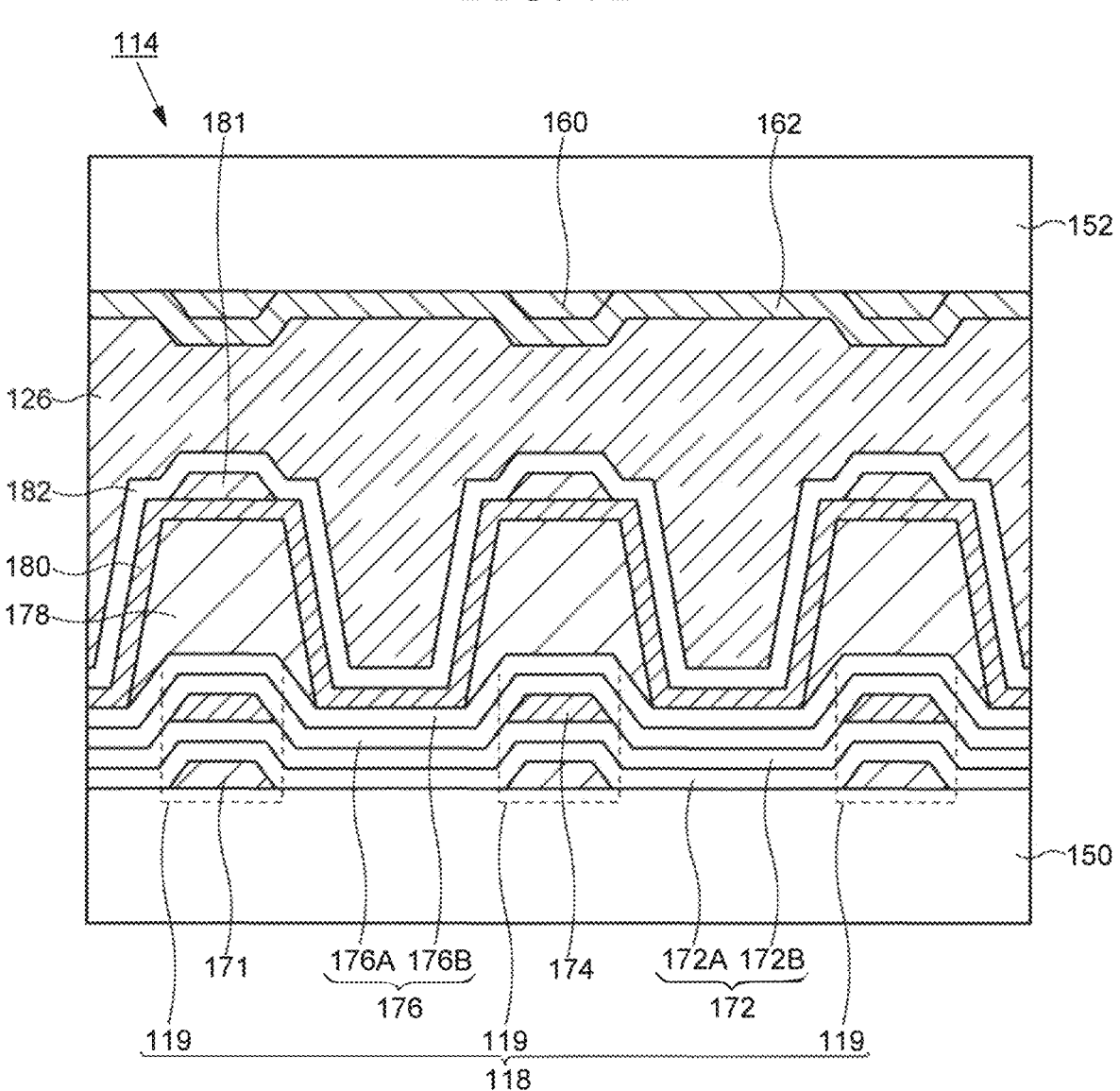
FIG. 7B is a cross-sectional view showing a configuration of wirings, a planarization layer, and a light shielding layer arranged in the peripheral region of a display device according to an embodiment of the present invention.

FIG. 7A shows a plan view of the first wiring pattern 118 and the second wiring pattern 120 arranged on the array substrate 150, and FIG. 7B shows a cross-sectional view of the peripheral region 114. The first wiring pattern 118 and the second wiring pattern 120 have the same structure as in the first embodiment. While the first wirings 119 and the second wirings 121 are arranged on the planarization layer 178, as shown in FIG. 7A, the planarization layer 178 in the region outside the first wirings 119 (119-1 to 119-5) and the second wirings 121 (121-1 to 121-5) is removed. As shown in FIG. 7B, the first transparent conductive layer 180 covers the top and sides of the planarization layer 178 and is arranged along the top surface of the second insulating layer 176 in the region where the planarization layer is removed.

Thus, the peripheral region 114 has a region where the planarization layer 178 is partially removed, similar to the display region 112. This configuration can reduce the effect of light absorption by the planarization layer 178 also in the peripheral region 114. Specifically, the absorption of light on the short wavelength side by the planarization layer 178 is reduced. Thereby, the difference in hue between the display region 112 and the peripheral region 114 can be prevented from being seen, and there is no difference in transparency. The display device 100 in this embodiment has the same configuration as that in the first embodiment except that the planarization layer 178 is partially removed, and the same effects can be achieved.

The first and second embodiments described above as embodiments of the present invention may be combined as appropriate, as long as they do not contradict each other. Any addition, deletion, or design change of configuration elements, or any addition, omission, or change of conditions of a process, made by a person skilled in the art based on the liquid crystal display device of each embodiment is also included in the scope of the present invention as long as it has the gist of the invention.

It is understood that other advantageous effects different from the advantageous effects provided by each of the above-described embodiments, which are obvious from the description herein or which can be easily foreseen by those skilled in the art, will naturally be provided by the present invention.

What is claimed is:

1. A display device, comprising:

an array substrate including a display region arranged with pixels and a peripheral region outside the display region;

a counter substrate including a light shielding layer and facing the array substrate; and a liquid crystal layer between the array substrate and the counter substrate, wherein the display region includes a plurality of scanning signal lines extending in a first direction and arranged in a second direction intersecting the first direction, and a plurality of data signal lines extending in the second direction and arranged in the first direction, wherein the peripheral region includes a plurality of first wirings connecting a scanning signal line driver circuit and the plurality of scanning signal lines, and a plurality of second wirings being supplied with a certain electric potential, wherein each of the plurality of first wirings is arranged in parallel and extends in a first diagonal direction intersecting both the first direction and the second direction, wherein each of the plurality of second wirings is arranged in parallel and extends in a second diagonal direction intersecting both the first direction and the second direction, wherein the light shielding layer includes a grid pattern overlapping the plurality of data signal lines and the plurality of scanning signal lines in the display region, a first stripe pattern overlapping the plurality of first wirings in the peripheral region, and a second stripe pattern overlapping the plurality of second wirings in the peripheral region.

2. The display device according to claim 1, wherein the first stripe pattern extends in the first diagonal direction, and the second stripe pattern extends in the second diagonal direction.

3. The display device according to claim 1, wherein the first diagonal direction and the second diagonal direction are parallel to each other.

4. The display device according to claim 1, wherein each of the plurality of first wirings includes a first linear portion and a second linear portion, the first linear portion extends in the second direction and is connected directly with the second linear portion, and the second linear portion extends in the first diagonal direction and is connected directly with one of the plurality of scanning signal lines.

5. The display device according to claim 1, wherein each of the plurality of first wirings includes a first linear portion and a second linear portion, the first linear portion extends in the second direction, and the second linear portion extends in the first diagonal direction and connects the first linear portion and the scanning signal line driver circuit.

6. The display device according to claim 1, wherein:

the pixel includes a pixel electrode and a transistor connected to the pixel electrode, the array substrate includes a planarization layer extending over the display region and the peripheral region, the pixel is arranged in a region where the planarization layer is removed, the plurality of first wirings and the plurality of second wirings are embedded in the planarization layer, the planarization layer includes a third stripe pattern that is removed in the peripheral region outside of the first wirings and a fourth stripe pattern that is removed in the peripheral region outside the second wirings, the third stripe pattern is overlapped with the plurality of first wirings, and the fourth stripe pattern is overlapped with the plurality of second wirings.

7. The display device according to claim 6, wherein the third stripe pattern extends in the first diagonal direction, and the fourth stripe pattern extends in the second diagonal direction.

8. The display device according to claim 1, wherein the plurality of first wirings is arranged evenly spaced with a first gap, and the plurality of second wirings is arranged evenly spaced with a second gap.

9. The display device according to claim 8, wherein a width of the first gap and a width of the second gap are equal.

10. A display device, comprising:

an array substrate including a display region arranged with pixels and a peripheral region outside the display region;

a counter substrate facing the array substrate; and a liquid crystal layer between the array substrate and the counter substrate, wherein the display region includes a plurality of scanning signal lines extending in a first direction and arranged in a second direction intersecting the first direction, and a plurality of data signal lines extending in the second direction and arranged in the first direction, wherein the peripheral region includes a plurality of first wirings connecting a scanning signal line driver circuit and the plurality of scanning signal lines, and a plurality of second wirings being supplied with a certain electric potential, wherein each of the plurality of first wirings is arranged in parallel and extends in a diagonal direction intersecting both the first direction and the second direction, wherein each of the plurality of second wirings is arranged in parallel and extends in the diagonal direction intersecting both the first direction and the second direction, and in the same direction as the plurality of first wirings, the pixel includes a pixel electrode and a transistor connected to the pixel electrode, the array substrate includes a planarization layer extending over the display region and the peripheral region, the pixel is arranged in a region where the planarization layer is removed, the plurality of first wirings and the plurality of second wirings are embedded in the planarization layer, the planarization layer has a stripe pattern that is removed in the peripheral region outside of the plurality of first wirings and the plurality of second wirings, and the stripe pattern is overlapped with the plurality of first wirings and the plurality of second wirings.

11. The display device according to claim 10, wherein the counter substrate further includes a light shielding layer, the light shielding layer includes a grid pattern overlapping the plurality of data signal lines and the plurality of scanning signal lines in the display region.

12. The display device according to claim 10, wherein the counter substrate further includes a light shielding layer, the light shielding layer includes a stripe pattern overlapping the plurality of first wirings and the plurality of second wirings in the peripheral region, and the plurality of first wirings, the plurality of second wiring and the stripe pattern of the light shielding layer extend in the same direction of the diagonal direction.

13. The display device according to claim 10, wherein each of the plurality of first wirings includes a first linear portion and a second linear portion, the first linear portion extends in the second direction and is connected directly with the second linear portion, and the second linear portion extends in the diagonal direction and is connected directly with one of the plurality of scanning signal lines.

14. The display device according to claim 10, wherein each of the plurality of first wirings includes a first linear portion and a second linear portion, the first linear portion extends in the second direction, and the second linear portion extends in the diagonal direction and connects the first linear portion and the scanning signal line driver circuit.

15. The display device according to claim 10, wherein the plurality of first wirings is arranged evenly spaced with a first gap, and the plurality of second wirings is arranged evenly spaced with a second gap.

16. The display device according to claim 15, wherein a width of the first gap and a width of the second gap are equal.

\*    \*    \*    \*    \*